(12) United States Patent
Hori et al.

(10) Patent No.: US 6,474,756 B2
(45) Date of Patent: Nov. 5, 2002

(54) RUBBER CRAWLER BELT

(75) Inventors: Kazutoshi Hori, Komatsu (JP); Hiroaki Watanabe, Komatsu (JP); Masatake Tamaru, Tatsunokuchi-machi (JP); Kenzo Kimoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/829,417

(22) Filed: Apr. 10, 2001

(65) Prior Publication Data

US 2002/0024256 A1 Feb. 28, 2002

(30) Foreign Application Priority Data

Aug. 30, 2000 (JP) ........................................ 2000-260982

(51) Int. Cl.⁷ ............................................... B62D 55/24
(52) U.S. Cl. ...................................... 305/178; 305/173
(58) Field of Search ................................. 305/178, 165, 305/167, 169, 173, 174, 175, 170, 166

(56) References Cited

U.S. PATENT DOCUMENTS

| | | | | | |
|---|---|---|---|---|---|
| 1,627,287 A | * | 5/1927 | Kegresse | ..................... | 305/170 |
| 2,343,239 A | * | 3/1944 | Mayne | ........................ | 305/170 |
| 3,212,627 A | * | 10/1965 | Beebee | ......................... | 305/166 |
| 3,498,684 A | * | 3/1970 | Hallaman | .................... | 305/170 |
| 5,295,741 A | * | 3/1994 | Togashi et al. | .............. | 305/174 |
| 5,363,936 A | * | 11/1994 | Grawey et al. | .............. | 305/174 |
| 5,593,218 A | * | 1/1997 | Katoh et al. | ................ | 305/174 |
| 6,079,802 A | * | 6/2000 | Nishimura et al. | .......... | 305/175 |
| 6,322,172 B2 | * | 11/2001 | Lussier | ........................ | 305/174 |

FOREIGN PATENT DOCUMENTS

| JP | 6-24366 | 2/1994 |
|---|---|---|
| JP | 2000-53037 | 2/2000 |

* cited by examiner

Primary Examiner—S. Joseph Morano
Assistant Examiner—Long Bae Nguyen
(74) Attorney, Agent, or Firm—Armstrong, Westerman & Hattori, LLP (57) ABSTRACT

A rubber crawler belt having a pattern of a lug provided on an outer circumferential side of a rubber belt has a central lug portion provided to continuously extend around a center portion in a width direction of the outer circumference of the rubber belt, in a waveform, and a plurality of branch lug portions each having a predetermined width and provided from the central lug portion toward left and right end portions of the rubber belt to be away therefrom diagonally in a circumferential direction, and an interval between the branched lug portions adjacent to each other being the same as an interval between drive protrusions, in the circumferential direction of the rubber belt.

7 Claims, 6 Drawing Sheets

RUBBER CRAWLER BELT

TECHNICAL FIELD

The present invention relates to a structure of a rubber crawler belt, and particularly relates to an endless rubber crawler belt attached to a track-laying vehicle including construction equipment such as a bulldozer and a hydraulic shovel, and having drive protrusions, which are driven by a drive sprocket, in an inner circumference and having a lug on an outer circumference.

BACKGROUND ART

The rubber crawler belts for track-laying vehicles, in which metal cores are embedded at fixed intervals in endless rubber belts and each tooth of drive sprockets is meshed with each metal core to thereby drive each core, are conventionally used. However, when the crawler belts are replaced due to abrasion or the like, and the old ones are cut to be transported for recycling, there is the disadvantage of the core metals making the cutting difficult to thereby make recycling difficult. As the means for eliminating the above disadvantage, there is a rubber crawler belt without core metals. The examples of this rubber belt are disclosed in Japanese Patent Laid-open No. 6-24366 and Japanese Patent Laid-open No. 2000-53037.

Japanese Patent Laid-open No. 6-24366 discloses an endless rubber crawler belt in which rubbers are stacked on both faces with a polyester cord as a core layer, which is intended for snow mobiles. Japanese Patent Laid-open No. 2000-53037 discloses a rubber crawler belt for snow vehicles, in which rubbers are stacked on both faces of a core material composed by high-tensile synthetic fiber and the like, with a rubber hardness of a lug on a tread face side being large at the tip end portion and the hardness gradually decreasing. The lug patterns in both cases are in parallel at predetermined intervals in a lateral direction, and are provided with driving protrusions.

Figure 6:
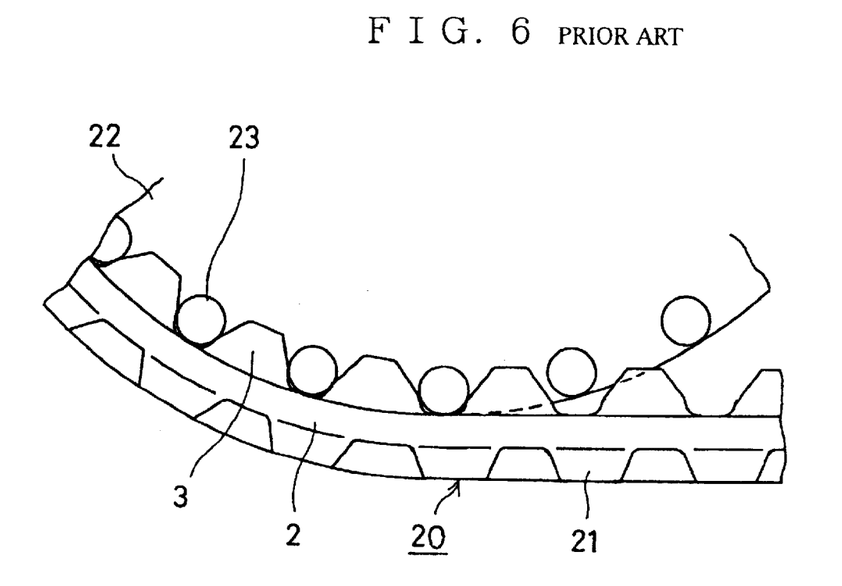
FIG. 6 is a side view showing relationship between a conventional rubber crawler belt and a drive sprocket.
Figure 7:
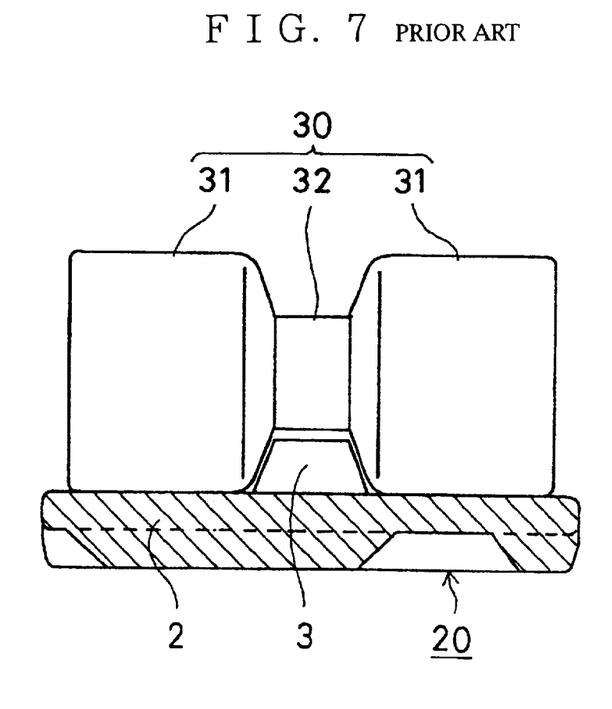
FIG. 7 is a partial sectional plan view showing relationship between the conventional rubber crawler belt and a roller.
Figure 8:
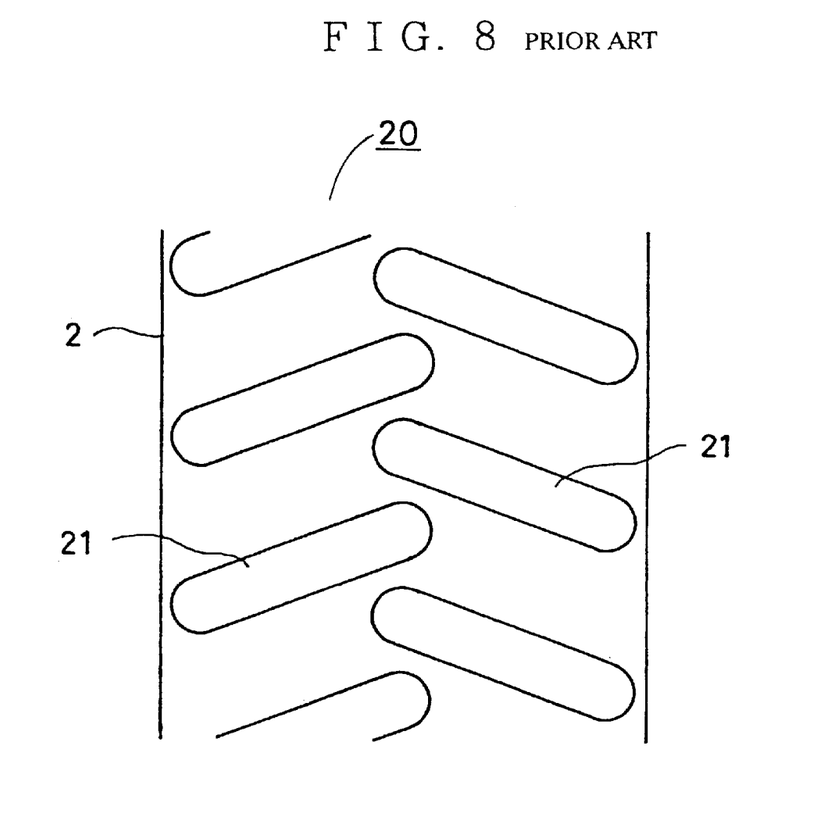
FIG. 8 is a plan view showing a lug pattern of the conventional rubber crawler belt.
Figure 9:
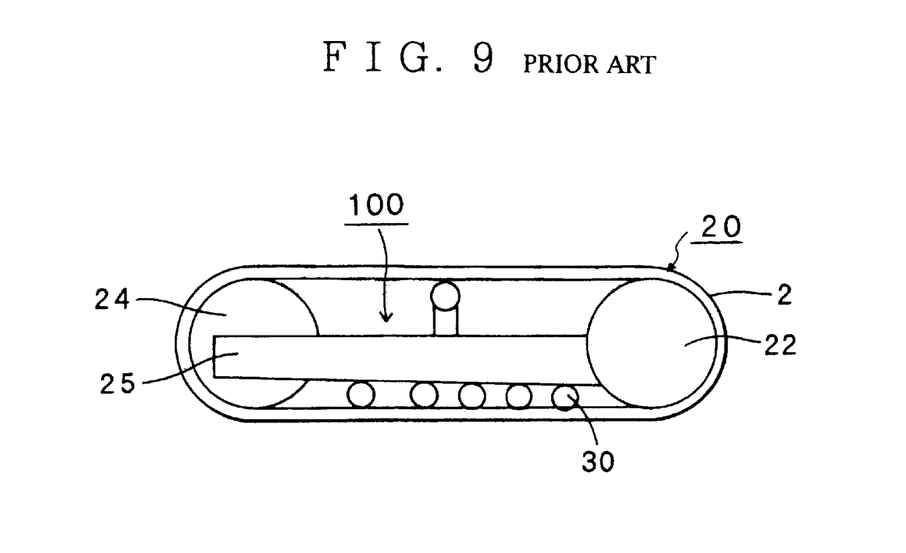
FIG. 9 is a schematic side view of a traveling unit and the rubber crawler belt of a conventional construction vehicle.

FIG. 9 is a schematic side view of a traveling unit 100 and a rubber crawler belt 20 such as a conventional construction vehicle. The traveling unit 100 includes a drive sprocket 22, an idler wheel 24, rollers 30 and a track frame 25. A rubber belt 2 of the rubber crawler belt 20 is wound around the traveling unit 100. FIG. 6 is a side view showing a structure of the rubber crawler belt 20. In FIG. 6, drive protrusions 3 are formed at predetermined intervals on an inner circumferential side of the endless rubber belt 2, and lugs 21 are provided on an outer circumferential ground-contact face side. The drive sprocket 22 is provided with sprocket pins 23 on an outer circumferential portion at the same intervals as the drive protrusions. The sprocket pins 23 are engaged with the drive projections 3 to transmit driving force to the rubber crawler belt 20. FIG. 7 shows the relationship between the rubber crawler belt 20 and the rollers 30. In FIG. 7, the roller 30 is constructed by connecting a pair of rollers 31 and 31, which are provided across the drive protrusion 3 of the rubber crawler belt 20, with a body portion 32. The width of the roller 30 is close to the entire width of the rubber belt 2. FIG. 8 shows an example of a pattern of the lugs 21 provided on an outer circumferential surface of the rubber belt 2. According to this example, the lugs 21 are formed from a center portion of the rubber belt 2 to a right and left end portion to alternately extend diagonally in a circumferential direction. The left and right lugs 21 are placed so as to be displaced a half pitch.

In the structures of the rubber crawler belts disclosed in the aforesaid Japanese Patent Laid-open No. 6-24366 and Japanese Patent Laid-open No. 2000-53037, the lower rollers drop between the adjacent lugs and flutter during the travel on a road surface, thus causing the disadvantage of offering poor riding quality. In the rubber crawler belt with the lug pattern as shown in FIG. 8, the end portions of the lugs in the center portion of the width direction of the rubber belt are separated from each other, whereby rocking motion occurs to cause vibrations during travel, thus causing the disadvantage of offering poor riding quality. Further, when the rubber belt is wound around the drive sprocket and the idler wheel, stress concentrates on the end portions, thus causing the fear of breakage.

SUMMARY OF THE INVENTION

The present invention is made in view of the above described disadvantages, and its object is to provide a rubber crawler belt with excellent riding quality and high durability without the fear of breakage.

In order to attain the above-described object, a first aspect of a rubber crawler belt according to the present invention includes an endless rubber belt wound around a traveling unit, a plurality of drive protrusions formed on the rubber belt at predetermined intervals in a circumferential direction of a center portion in a width direction of the inner circumferential side of the rubber belt, and each for meshing with each pitch of a drive sprocket of the traveling unit, and a lug provided on an outer circumferential side of the rubber belt and having a predetermined pattern, with a plurality of core wires being embedded inside the rubber belt, and is characterized in that the pattern of the lug has a central lug portion provided to continuously extend around a center portion in a width direction of the outer circumference of the rubber belt, in a waveform, and a plurality of branch lug portions each having a predetermined width and provided from the central lug portion toward left and right end portions of the rubber belt to be away therefrom diagonally in a circumferential direction, an interval between the branch lug portions adjacent to each other is the same as an interval between the adjacent drive protrusions, in the circumferential direction of the rubber belt, and a plurality of branch lug portions provided at a right end portion side and a plurality of branch lug portions provided at a left end portion side are arranged to be displaced one half of the interval between the drive protrusions in the circumferential direction of the rubber belt.

According to the above configuration, since the continuous central lug portion is provided, the amount of rocking motion during travel is decreased, thus reducing the vibration to an operator to a large extent. Further, when the rollers move on the inner circumferential surface of the rubber belt, the area of the ground contact portion between the lug and the road surface always becomes constant. Accordingly, the rigidity of the rubber belt becomes almost constant, whereby drop is decreased when the rollers pass, thus drastically improving riding quality.

Further, in the rubber crawler belt, the predetermined width of the branch lug portion may gradually decrease from an area near the central lug portion toward the left and right end portions.

According to the above configuration, the width of the groove portion between the adjacent branch lugs gradually increases from the area near the center portion in the lateral direction toward the end portion. As a result, earth sheared and caught in the groove portion easily falls off, when the groove portion is wound around the drive sprocket or the idler wheel. Accordingly, when the groove portion contacts the ground once again, it easily digs into the ground surface, thus preventing skids and reduction in tractive force.

Further, in the rubber crawler belt, a groove portion may be formed between the branch lug portions adjacent to each other, and an end portion of the groove portion, which is in contact with the central lug portion, may be placed within a plane of outer-circumferential-side projection of the drive protrusion provided on the inner circumferential side of the rubber belt.

According to the above configuration, when the rubber crawler belt is wound around the drive sprocket or the idler wheel and thereby a bending force works, distortion is dispersed and the winding form is closer to a circle. In addition, stress at the tip end portion of the groove portion is reduced, thus increasing meshing efficiency of the crawler belt and dive sprocket, and reducing the fear of breakage.

Further, in the rubber crawler belt, in the inner circumferential side of the rubber belt, a convex stripe portion may be provided at a position being a plane of an inner-circumferential-side projection of the groove portion provided on the outer circumferential side, from the drive protrusion toward the left and right end portion in the width direction of the rubber belt.

According to the above configuration, when the rollers pass, fewer drops occur to the groove portions, thus improving riding quality. Further, mud and earth remaining in the inner circumference of the rubber belt are easily discharged, and mud and earth in the meshing portion with the drive sprocket are reduced to thereby increasing durable life.

A second aspect of the rubber crawler belt according to the present invention is an integrally formed rubber crawler belt including an endless rubber belt wound around a traveling unit, a plurality of drive protrusions provided in a circumferential direction of an inner circumferential side of the rubber belt, and each for meshing with each pitch of a drive sprocket of the traveling unit, and a lug provided on an outer circumferential side of the rubber belt, with a plurality of core wires being embedded in parallel across almost the entire width of the rubber belt, and is characterized in that the core wires have first core wires each with a large line diameter, which are embedded in a predetermined width of a center portion in a width direction of the rubber belt, and second core wires each with a smaller line width than the first core wire, which are embedded in both left and right end portion sides of the predetermined width.

According to the above configuration, since the diameter of the core wire in the center portion for mainly transmitting pulling force is made larger, the pulling strength of the rubber crawler belt is increased, and durability is increased. On the other hand, since the diameter of the core wires at both left and right end portion sides is made smaller, the weight is reduced, and thus the cost can be reduced.

A third aspect of the rubber crawler belt according to the present invention includes an endless rubber belt wound around a traveling unit, a plurality of drive protrusions provided in a circumferential direction of an inner circumferential side of the rubber belt, and each for meshing with each pitch of a drive sprocket of the traveling unit, and a lug provided on an outer circumferential side of the rubber belt, with a plurality of core wires being embedded in parallel across almost the entire width of the rubber belt, and is characterized in that a rubber material of the rubber belt in an inner circumferential side from the core wires is of an NR (Natural Rubber) family or an SBR (Styrenebutadiene Rubber) family with a hardness of 70 to 85 IRHD (International Rubber Hardness Degree), and is harder than a rubber material thereof in an outer circumferential side from the core wires.

According to the above configuration, a rubber in the inner circumferential side in contact with the rollers is a hard rubber of an NR family or an SBR family with a hardness of 70 IRHD to 85 IRHD, thus reducing cracks caused by a rock and stone catching the rubber belt while the rollers are traveling, and increasing the durable life. It should be noted that "the rubber hardness of 70 IRHD to 85 IRHD" is hardness based on the international standard "ISO 48" issued in 1994.

BEST MODE FOR CARRYING OUT THE INVENTION

A preferred embodiment of a rubber crawler belt according to the present invention will be explained in detail below with reference to the drawings. A traveling unit 100, a drive sprocket 22, sprocket pins 23, an idler wheel 24 and rollers 30 are the same as those in the prior arts explained in FIG. 7 and FIG. 9, and the illustration in the drawings and the explanation thereof will be omitted.

Figure 1:
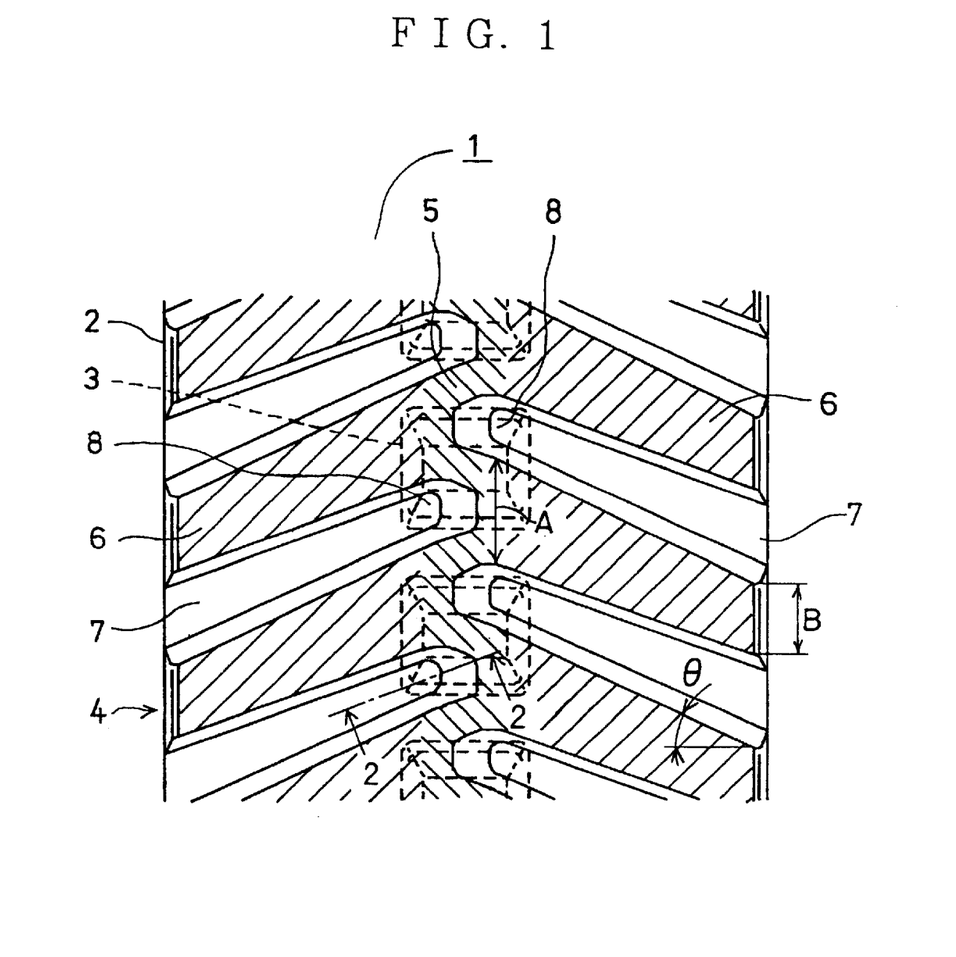
FIG. 1 is a plan view showing a lug pattern on an outer circumferential side of a rubber crawler belt according to an embodiment of the present invention.

FIG. 1 is a plan view of an outer-circumferential ground contact surface side showing a lug pattern of a rubber crawler belt 1 of the present invention. In order to make it clearer, hatching is applied to a top portion of a lug 4. In FIG. 1, drive protrusions 3 meshed with the sprocket pins 23 of the drive sprocket 22 are disposed at predetermined intervals in a circumferential direction in a center portion in a width direction of an inner circumferential surface of a rubber belt 2. A lug 4 is provided on the outer-circumferential ground contact surface of the rubber belt 2. A pattern of the lug 4 is defined by a center lug portion 5 continuously extending in a waveform in the circumferential direction around the center portion in the width direction of the rubber belt 2, and a plurality of branch lug portions 6 disposed toward left and right end portions from the central lug portion 5.

Figure 2:
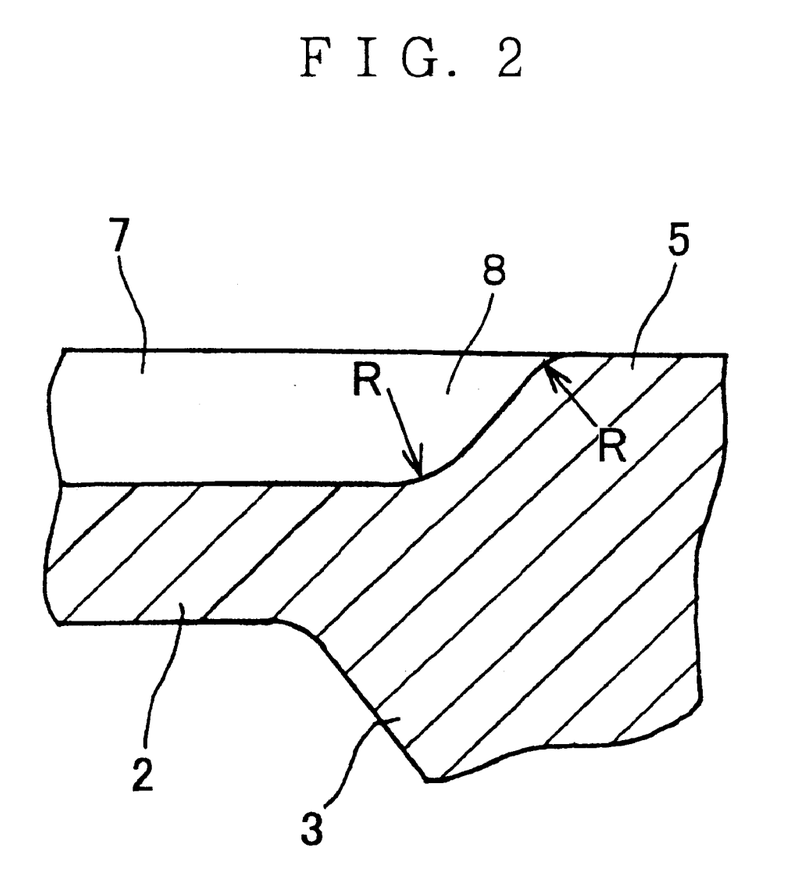
FIG. 2 is a sectional view taken along the line 2—2 in FIG. 1.

The branch lug portion 6 has a predetermined width, and is disposed so as to be away diagonally in the circumferential direction from the central lug portion 5 toward the left and right end portions. The interval between the branch lug portions 6 in the circumferential direction is the same as the interval between the drive protrusions 3. Further, the left and right branch lug portions 6 and 6 are disposed in the state in which they are displaced one half of the interval between the drive protrusions 3 with respect to each other in a longitudinal direction of the rubber belt 2, that is, a so-called zigzag form. The branch lug portion 6 secures a predetermined ground contact area at a rearward inclined angle θ of 10 degrees to 50 degrees. Widths A near a center portion of the branch lug portions 6 gradually become smaller toward a width B each at the left and right end portions. An end portion 8 of a groove portion 7 formed between the adjacent branch lug portions 6 and 6, which is in contact with the central lug portion 5, is placed within a plane of projection of the drive protrusion 3. FIG. 2 is a sectional view taken along the line 2—2 in FIG. 1. As shown in FIG. 2, a curved surface R is provided at a portion where the end portion 8 is connected to the groove portion 7 and the central lug portion 5 respectively so that concentrated stress is reduced. The curved surface R may be a chamfer.

Figure 3:
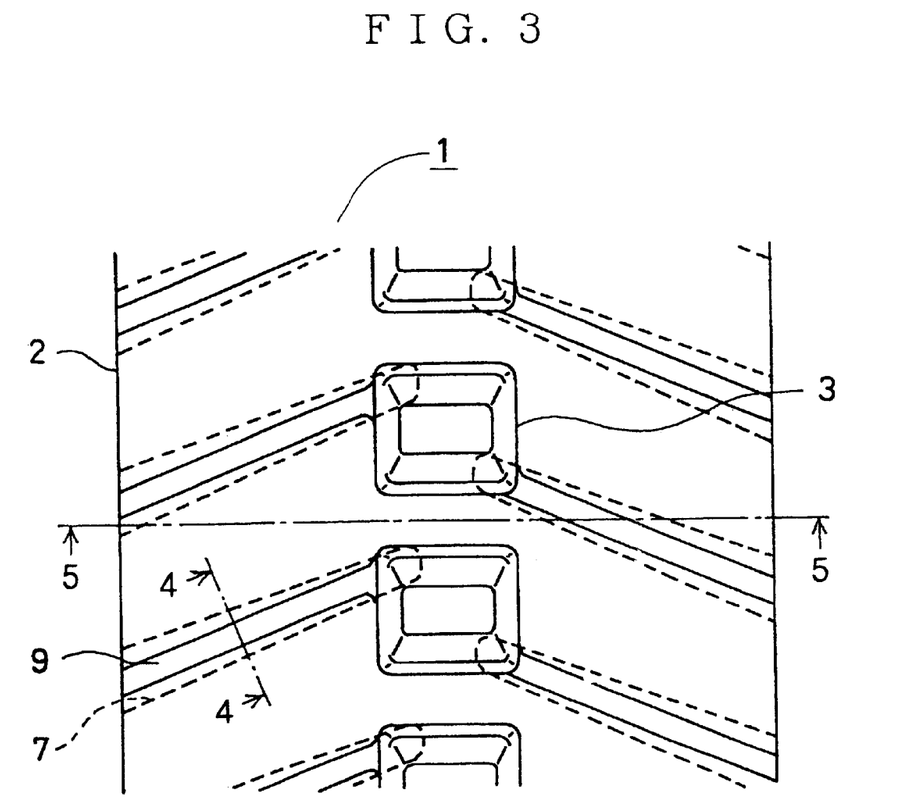
FIG. 3 is a plan view of an inner circumferential side of the rubber crawler belt in FIG. 1.
Figure 4:
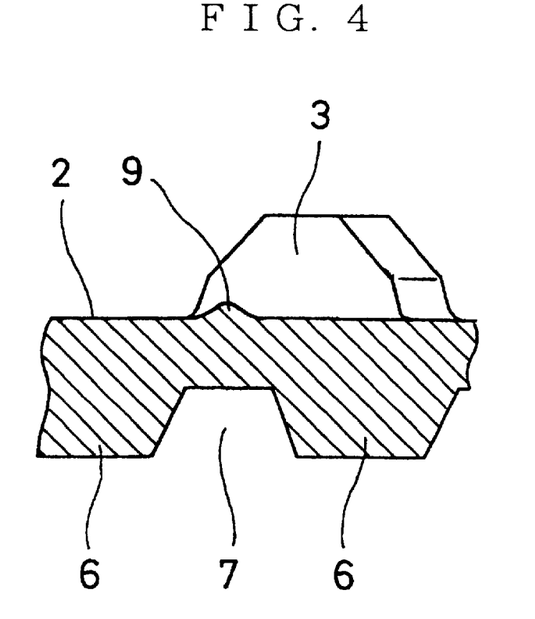
FIG. 4 is a sectional view taken along the line 4—4 in FIG. 3.

FIG. 3 is a plan view of an inner circumferential surface of the rubber crawler belt 1. In FIG. 3, the drive protrusions 3 are provided at predetermined intervals in the longitudinal direction of the rubber belt 2, in the center portion of the lateral direction of the rubber belt 2. On the inner circumferential surface of the rubber belt 2, convex stripe portions 9 are provided each in an almost center portion of a plane of projection of the groove portion 7 provided on the outer circumferential surface, from the drive protrusion 3 to left and right end portions. FIG. 4 is a sectional view taken along the line 4—4 in FIG. 3, and shows a sectional form of the convex stripe portion 9.

Figure 5:
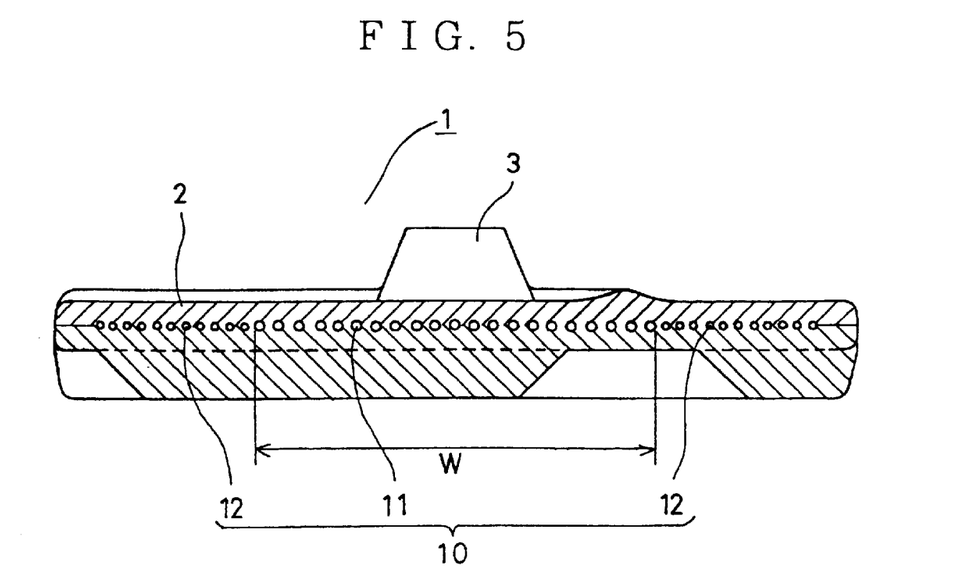
FIG. 5 is a sectional view taken along the line 5—5 in FIG. 3.

FIG. 5 is a sectional view taken along the line 5—5 in FIG. 3. In FIG. 5, a plurality of endless core wires 10 are embedded in parallel in the rubber belt 2 across almost the entire width of the rubber belt 2. The core wire 10 is a steel cord or aramid fiber, so that pulling strength in the circumferential direction of the rubber belt 2 is enhanced. The thickness of a first core wire 11 disposed within a predetermined range W in the lateral direction of the rubber belt 2 is larger than the thickness of second core wires 12 and 12 on both end sides. The rubber material of the rubber belt 2 in the inner circumferential side from the core wires 10 are of an NR family or an SBR family with a hardness of 70 IRHD to 85 IRHD, which is set to be harder than the rubber material in the outer circumferential side from the core wires 10.

The rubber crawler belt 1 of the present invention is structured as above, thus making it possible to obtain the following effects.

(1) The continuous central lug portion 5 is provided, thus reducing the amount of locking motion occurring during travel, and the vibration of the vehicle body is reduced to a large extent. Further, since the branch lug portions 6 are inclined and are displaced one half pitches with respect to the left and right branch lug portions 6, the contact area of the lug 4, which moves as the rollers 30 travel, with the road surface becomes almost constant, and rigidity of the rubber becomes almost constant to reduce the amount of drop of the rollers 30, thus increasing riding comfort to a great extent. It should be noted that the continuous lug 4 is not limited to be continuously formed to have the same height. For example, a notch may be formed at a part of the ground contact portion of the lug 4, and as for the height of the lug 4, higher portions and/or lower portions may be partially formed. The lug 4 mentioned here means a raised portion for supporting load in a vertical direction and for making it possible to generate tractive force not only on a hard road surface but also on a soft road surface.

(2) The width of the groove portion 7 is gradually increased toward the left and right end portions from the area near the center portion. As a result, when the rubber crawler belt 1 is wound around the drive sprocket 22 or the idler wheel 24, the soil caught in the groove portion 7 is easily discharged. Thus, reduction in tractive force due to the soil caught therein can be prevented.

(3) The contact point of the groove portion 7 and the central lug portion 5 is placed within the plane of projection of the drive protrusion 3. As a result, when the rubber crawler belt 1 is wound around the drive sprocket 22 or the idler wheel 24, the rigidity of the drive protrusion 3 is reduced, and distortion is dispersed, whereby the rubber crawler belt 1 is wound around it so as to be in an almost circular form. Consequently, the rubber crawler belt 1 has its meshing efficiency with the drive sprocket 22 improved, and it moves smoothly, thus reducing the amount of brattle. Further, the curved surface R is provided at a portion where the end portion 8 is connected to the groove portion 7 and the central lug portion 5, thus dispersing stress and reducing the occurrence of cracks.

(4) On the inner circumferential surface of the rubber belt 2, the convex stripe portion 9 is provided almost in the center portion of the plane of projection of the groove portion 7 provided on the outer circumferential surface. As a result, the amount of the rollers 30 dropping into the groove portion 7 is reduced, thus improving riding comfort. When the rollers 30 roll on the inner circumferential surface of the rubber belt 2, mud and earth remaining on the inner circumferential surface are discharged leftward and rightward along the convex stripe portions 9, thus reducing dirt and soil remaining in the meshing portion with the drive sprocket 22, whereby the abrasion in this portion is reduced.

(5) Since the diameter of the core wire 11 within the predetermined width of the rubber belt 2 is increased, the strength of the first core wires 11 in the center portion at which the strength is required is increased, thus increasing durability. Further, since the second core wires 12 at both end portions are made thinner, the weight is reduced, thus reducing cost. In addition, the hardness of the rubber in the inner circumferential side is made higher by using rubber of an NR family or an SBR family, the occurrence of cracks during the travel of the rollers 30 is reduced, thus increasing durable life.

In the aforementioned embodiment, two kinds of thickness are prepared for the core wires 11 and 12, but the other combinations, such as the thickness of the core wires being gradually reduced from the center portion toward the end portions and the like may be suitable.

What is claimed is:
1. A rubber crawler belt including
an endless rubber belt wound around a traveling unit,
a plurality of drive protrusions formed on said rubber belt at predetermined intervals in a circumferential direction of a center portion in a width direction of an inner circumferential side of said rubber belt, and each for meshing with each pitch of a drive sprocket of said traveling unit, and
a lug provided on an outer circumferential side of said rubber belt and having a predetermined pattern, with a plurality of core wires being embedded inside said rubber belt, wherein the pattern of said lug has a central lug portion provided to continuously extend around a center portion in a width direction of the outer circumference of said rubber belt, in a waveform, and a plurality of branch lug portions each having a predetermined width and provided from said central lug portion toward left and right end portions of said rubber belt to be away therefrom diagonally in a circumferential direction, an interval between said branch lug portions adjacent to each other is the same as an interval between said drive protrusions, in the circumferential direction of said rubber belt, and a plurality of said branch lug portions provided at a right end portion side and a plurality of said branch lug portions provided at a left end portion side are disposed to be displaced one half of the interval between said drive protrusions in the circumferential direction of said rubber belt.

2. The rubber crawler belt in accordance with claim 1, wherein a groove portion is formed between said branched lug portions adjacent to each other, and wherein an end portion of said groove portion, which is in contact with said central lug portion, is placed within a plane of outer-circumferential-side projection of said drive protrusion provided on the inner circumferential side of said rubber belt.

3. The rubber crawler belt in accordance with claim 1, wherein the predetermined width of said branched lug portion gradually decreases from an area near said central lug portion toward the left and right end portions.

4. The rubber crawler belt in accordance with claim 3, wherein a groove portion is formed between said branched lug portions adjacent to each other, and wherein an end portion of said groove portion, which is in contact with said central lug portion, is placed within a plane of outer-circumferential-side projection of said drive protrusion provided on the inner circumferential side of said rubber belt.

5. The rubber crawler belt in accordance with claim 2 or claim 4, wherein in the inner circumferential side of said rubber belt, a convex stripe portion is provided at a position being a plane of an inner-circumferential-side projection of said groove portion provided on the outer circumferential side, from said drive protrusion toward the left and right end portions in the width direction of said rubber belt.

6. A rubber crawler belt including an endless rubber belt wound around a traveling unit, a plurality of drive protrusions provided in a circumferential direction of an inner circumferential side of said rubber belt, and each for meshing with each pitch of a drive sprocket of said traveling unit, and a lug provided on an outer circumferential side of said rubber belt, with a plurality of core wires being embedded in parallel across almost the entire width of said rubber belt, wherein said core wires have first core wires each with a large line diameter, which are embedded in a predetermined width of a center portion in a width direction of said rubber belt, and second core wires each with a smaller line width than said first core wire, which are embedded in both left and right end portion sides of said predetermined width.

7. A rubber crawler belt comprising:

an endless rubber belt wound around a traveling unit, a plurality of drive protrusions provided in a circumferential direction of an inner circumferential side of said rubber belt, and each for meshing with each pitch of a drive sprocket of said traveling unit, a lug provided on an outer circumferential side of said rubber belt, said lug having a central lug portion provided to continuously extend around a center portion in a width direction of the outer circumference side of said rubber belt in a wave form, and a plurality of core wires embedded in parallel across almost the entire width of said rubber belt, wherein a rubber material of said rubber belt in an inner circumferential side from said core wires is of an NR family or an SBR family with a hardness of 70 IRHD to 85 IRHD, and is harder than a rubber material thereof in an outer circumferential side from said core wires.

* * * * *